United States Patent [19]

Genaro, deceased

[11] E Re. 29,516

[45] Reissued Jan. 17, 1978

[54] AUTOMATIC SURFACE POLISHING SYSTEM

[75] Inventor: Joseph L. Genaro, deceased, late of Fort Wayne, Ind., by Beverly Ann Genaro, administratrix

[73] Assignee: Shur Brite Wax-O-Matic, Inc., Brentwood, Tenn.

[21] Appl. No.: 635,097

[22] Filed: Nov. 25, 1975

Related U.S. Patent Documents

Reissue of:

[64] Patent No.: 3,774,259
Issued: Nov. 27, 1973
Appl. No.: 144,452
Filed: May 18, 1971

U.S. Applications:

[63] Continuation-in-part of Ser. No. 13,096, Feb. 20, 1970, abandoned.

[51] Int. Cl.[2] ..... B60S 3/06

[52] U.S. Cl. ..... 15/97 B; 15/DIG. 2; 51/337; 118/112

[58] Field of Search ..... 15/4, 97 B, DIG. 2, 15/230–230.19; 118/112, 106, 255, 258, 4; 51/337

[56] References Cited

U.S. PATENT DOCUMENTS

| | | | |
|---|---|---|---|
| 1,897,971 | 2/1933 | Johnston | 51/337 |
| 1,908,788 | 5/1933 | Pulliam | 15/97 R |
| 2,522,092 | 9/1950 | Churchill | 15/230.14 |
| 2,583,703 | 1/1952 | Morison | 15/97 B |
| 2,646,586 | 7/1953 | Foutes | 15/97 B |
| 2,785,516 | 3/1957 | Hendrickson | 15/230.14 |
| 3,037,223 | 6/1962 | Lovsey | 15/4 X |
| 3,083,683 | 4/1963 | Fischer et al. | 118/106 |
| 3,460,178 | 8/1969 | Lecouturier et al. | 15/31 |
| 3,499,180 | 3/1970 | Hurwitz | 15/97 B |
| 3,504,394 | 4/1970 | Weigele et al. | 15/97 B |
| 3,528,119 | 9/1970 | Fergerson | 15/DIG. 2 |
| 3,685,217 | 8/1972 | Belanger | 15/230.14 |

*Primary Examiner*—Edward L. Roberts
*Attorney, Agent, or Firm*—Harrington A. Lackey

[57] ABSTRACT

An automatic surface polishing system utilizing strips of material to apply polish to a finished surface and strips of material to subsequently buff that surface. Fabric strips are attached about the periphery of rotating drums. Polish is applied to the strips and is then applied by the strips to the surface and rubbed-in by intermittent contacts between the strips and the surface. The polished surface is caused to dry and is then buffed by additional dry fabric strips which make intermittent contact with the surface.

24 Claims, 7 Drawing Figures

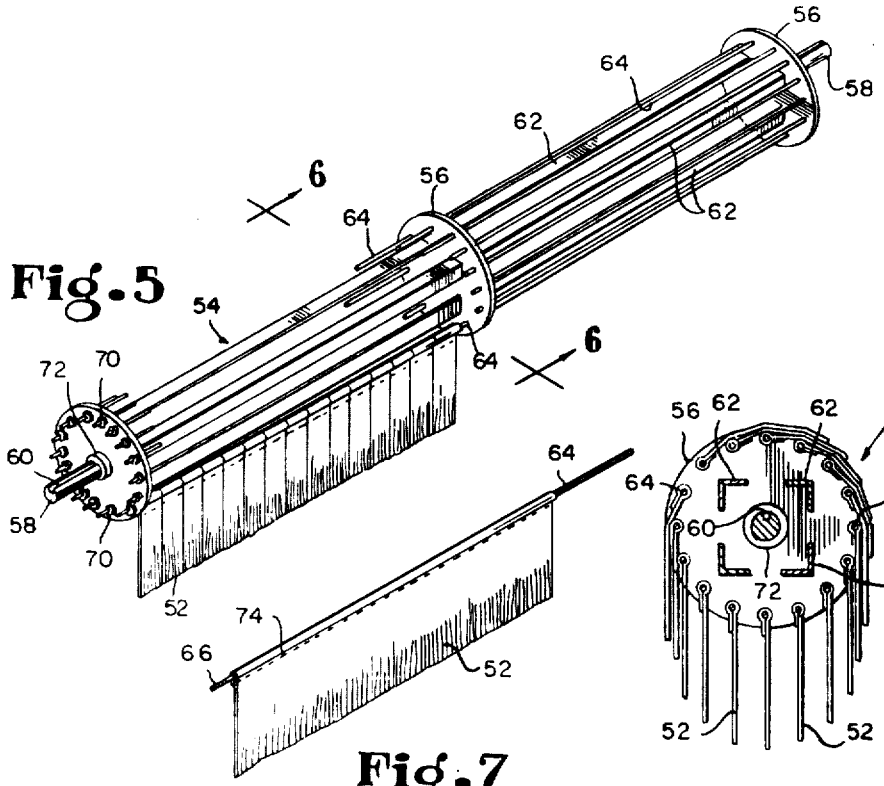
Fig.5
Fig.7
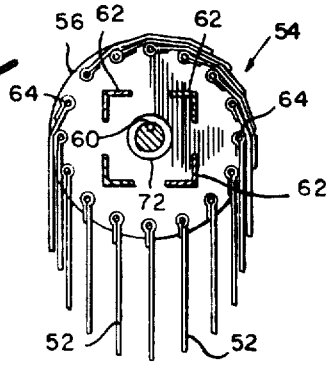
Fig.6
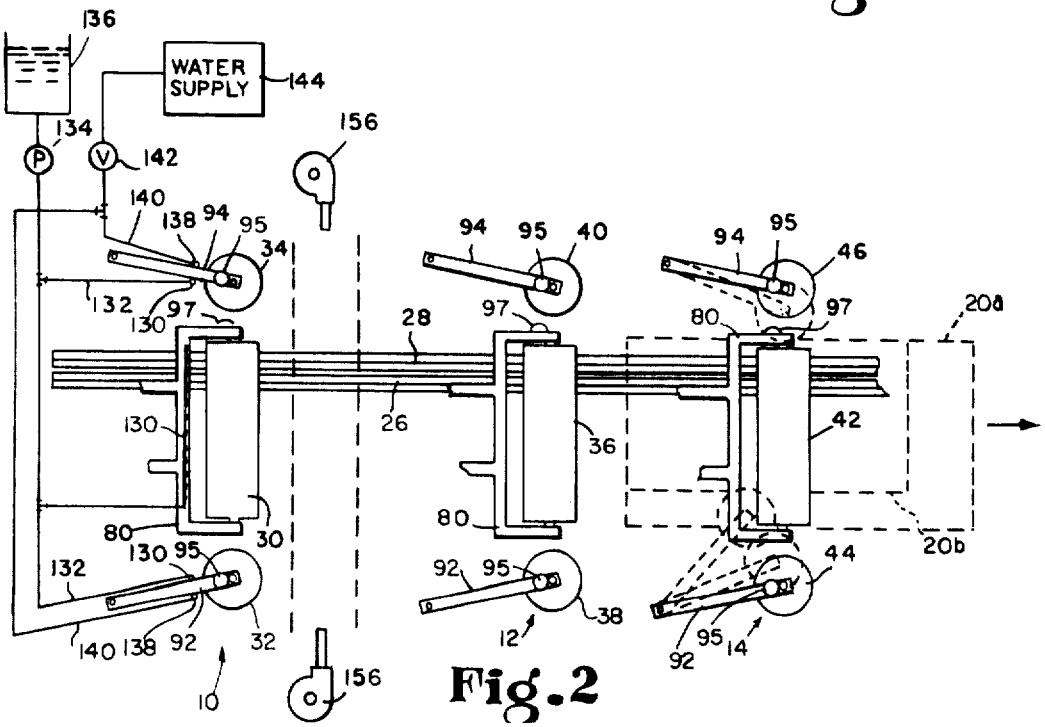
Fig.2

AUTOMATIC SURFACE POLISHING SYSTEM

Matter enclosed in heavy brackets [ ] appears in the original patent but forms no part of this reissue specification; matter printed in italics indicates the additions made by reissue.

This application is a continuation-in-part of my copending application, Ser. No. 13,096, filed Feb. 20, 1970, now abandoned.

BACKGROUND OF THE INVENTION

This invention relates to apparatus for automatically polishing surfaces, and more particularly to apparatus for automatically polishing surfaces of vehicles such as automobiles.

Polishing surfaces such as the finished surfaces of automobiles necessitates the application of a polish, wax or cleaner to the surface and subsequently removing the residue. As used herein "polish" means any polish, wax, cleaner, or similar substance, or combinations thereof. The polish application stage should include sufficient frictional contact between the applicator and the surface to allow the polish to interact with the finish to remove discoloration and other blemishes which mar the finish. In other words it is generally desirable that the polish be "rubbed-in" to the surface. The polish removal stage should also include frictional contact with the surface in order to properly buff or polish it.

During both the polish application and removal stages, care must be exercised to prevent excessive heat from being generated by the frictional contact with the finished surface, and to avoid scratching or otherwise damaging the surface. Whether a polish is being applied or removed by a cloth or brush, and whether manually or automatically operated, the heat generated by friction tends to be held in or trapped against the surface. Excessive heat may cause permanent damage to a finished surface, as by burning off a portion of the paint or other finish. Naturally, this problem is much less acute when polish is applied and removed by a hand-held cloth. While limitations of the physical strength and stamina of a person hand-polishing a surface lessens the likelihood that the finish will be damaged, those same factors restrict the speed and uniformity with which the surface may be polished. On large surfaces, such as the surfaces of the body of automobiles and other vehicles, such limitations on the speed and uniformity of the polishing operation, as well as the physical strain on the persons involved, militates against hand-polishing on a large-scale basis.

Although hand-held machines for applying and removing polish may somewhat reduce the human labor factor and increase the speed of the operation, their use requires considerable skill in order to prevent damaging a finished surface. Such devices, which for example may comprise a rotating or vibrating pad, tend to trap heat against the surface. The operator must use enough pressure for a sufficient time to effect a polished surface. Too much pressure or too long a time spent in one area may be disastrous for the finish. Uneven pressure may also result in circular marks in the polished finish, commonly referred to as swirl marks. And the human labor factor is still too great and the speed too slow for economical large-scale polishing operations.

An automatic surface polishing system especially adapted to polish large surfaces, such as those of automobiles, quickly, and with uniformity, and without damaging the finish, is needed in order to permit large-scale polishing of such surfaces on an economical basis. This invention fulfills that need.

Automatic car washing systems are well known. Numerous ways have been devised to wash and dry vehicles, including the use of strategically spaced water spray nozzles, brushes and blowers, and rather sophisticated mechanical and electrical controls therefor. Some automatic car washing systems are also equipped to spray a liquid wax or polish onto the vehicle during the operation. These so-called waxing operations do not use any frictional contact in applying the material or in removing the residue. Application and removal are both inadequate.

Rotating washing brushes are used in automatic car wash systems, but rotating brushes or pads for polishing do not achieve the results of the present invention. Rotating brushes or pads tend to cause scratching and localized over-heating of the surface with consequent damage to the finish, and they are not well adapted for use with the irregular and contoured surfaces presented by many vehicles. Moreover, the polish tends to rapidly accumulate on such buffers, necessitating frequent cleaning in order to assure a proper buffing operation. The present invention overcomes these problems and provides a fast, efficient polishing system suitable for use as a mass vehicle-polishing installation.

BRIEF DESCRIPTION OF THE DRAWING

Apparatus in accordance with this invention is illustrated in the accompanying drawings in which:

FIG. 2 is a partially diagrammatic top view of the apparatus shown in FIG. 1;

FIG. 5 illustrates the construction of the rotating drums;

FIG. 6 is a view taken along the line 6—6 in FIG. 5, but showing fabric strips attached to the rods of the drum; and FIG. 7 illustrates a single fabric partially cut to form strips therein.

DETAILED DESCRIPTION OF A PREFERRED EMBODIMENT

Figure 1:
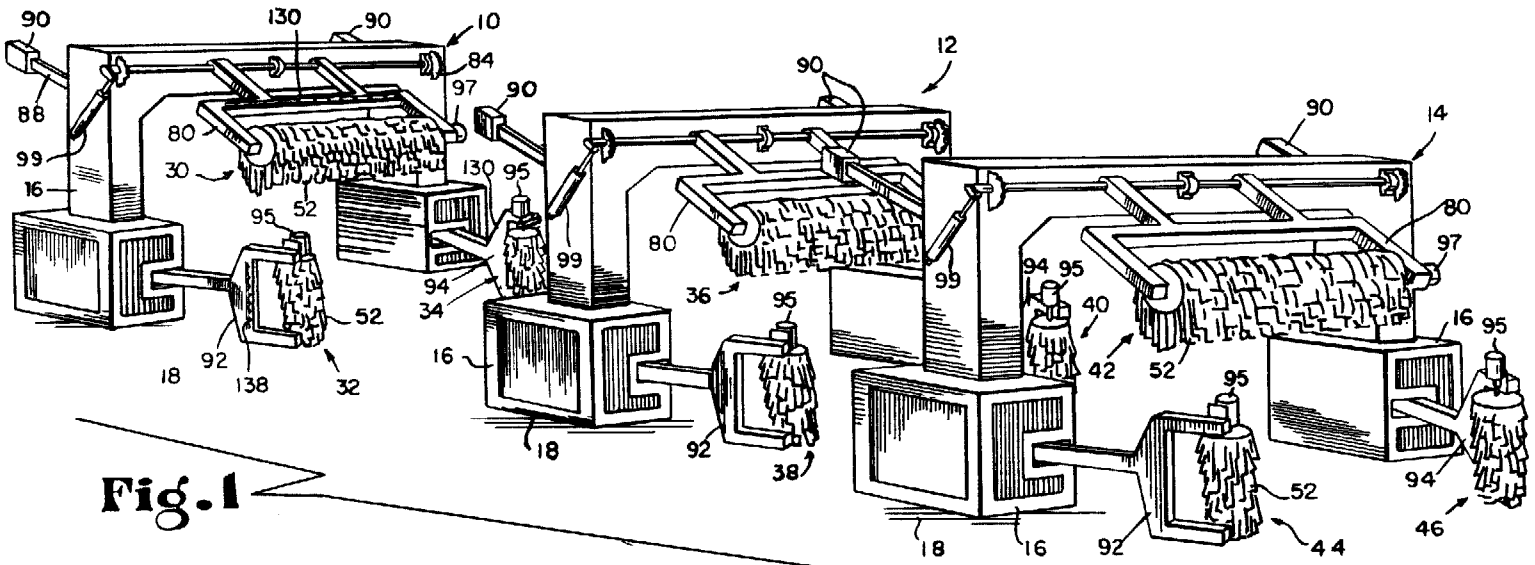
FIG. 1 is an overall perspective view of the apparatus but with the conveyor omitted.
Figure 4:
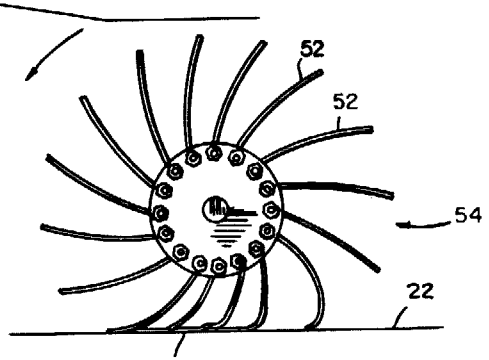
FIG. 4 is an end view of a rotating drum illustrating the action of the fabric strips in contacting and being dragged across a surface.
Figure 3:
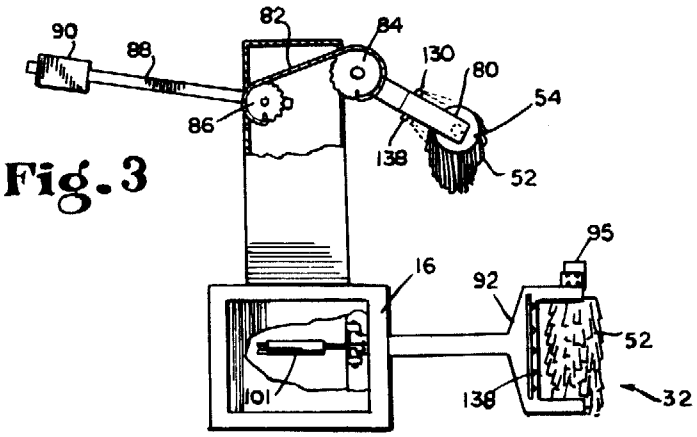
FIG. 3 is a side view of the pod at the left hand side of the first or polish application stage, partially broken away.

The polishing apparatus illustrated in the drawing is a three-stage installation for polishing the surfaces of vehicles, such as automobiles. As best seen in FIGS. 1 and 3, the apparatus has a first stage 10, which is the polish application stage, and second and third stages 12 and 14, respectively, which are buffing stages. The equipment at each stage is contained within or connected to a structural frame or pod 16. Pods 16 are affixed to the floor 18. A vehicle to be polished moves successively through the first, second and third stages, or from left to right in the drawing. A vehicle is represented generally by dotted lines 20a and 20b (FIG. 2), which indicate vehicles of different size. A surface to be polished, such as the roof or sides of an automobile, is represented as 22 (FIG. 4).

A vehicle to be polished may be moved through the three stage installation in any convenient manner, as by being pulled by an endless chain conveyor 26. The conveyor 26 and a guide rail 28 run along the floor 18 adjacent one side of pods 16. For clarity, the conveyor and guide rail are not depicted in FIG. 1.

At the first stage 10, a horizontally disposed polish applicator 30 and vertically disposed polish applicators 32 and 34 are supported from pod 16, and are positioned in proximity to the top and both side surfaces of a vehicle during relative movement between the vehicle and this first stage.

The second stage 12 has a horizontal polisher 36 and vertical polishers 38 and 40 which are positioned in proximity to the top and both side surfaces of a vehicle during relative movement between the vehicle and the second stage.

The third stage 14 has a horizontal polisher 42 and vertical polishers 44 and 46 which are positioned in proximity to the top and both side surfaces of a vehicle during relative movement between the vehicle and the third stage.

The applicators and polishers are generally similar. In each, strips of a flexible material are attached to a rotatable drum at spaced intervals about its periphery. The material to be used should be a closely interwoven or matted material, such as a natural or synthetic fabric, and should preferably have a resilient backing. A heavy woven fabric such as cotton carpeting or predominately cotton carpeting with a rubber backing has proved satisfactory for use with this apparatus.

Construction of the applicators and the polishers is best seen in FIGS. 4–7. Fabric strips 52 are affixed to a rotatable drum 54 at spaced intervals about its circumference. Drums 54 each include two or more disks 56 which are carried on a rotatable shaft 58, keyed as at 60. Each disk 56 has a plurality of openings 57 through it adjacent to and spaced about its periphery. The disks 56 are interconnected by supporting means such as angle irons 62 which are welded to the disks, with the openings 57 in the disks aligned with one another. Rods 64, having threaded ends as at 66, fit through corresponding disk openings 57. The threaded rod ends 66 are secured to the end disks 56 by fasteners, such as nuts 70. By tightening or loosening nuts 70, the tension on rods 64 may be individually varied. A hub 72 on each end of the disk holds the disk in position on the keyed shaft 60.

A fabric strip 52 is secured to each of the rods 64, as by lapping one end over the rod and stitching it as shown at 74 in FIG. 7. A single fabric, partially cut to form strips, as illustrated in FIG. 7, or a plurality of fabric strips, as illustrated in FIG. 5, may be used on each rod. The strips should be relatively narrow (in the longitudinal direction) in order to permit them to conform to the contour of the surface, as will be more fully explained. The rods may be individually removed to facilitate changing the strips.

At the first stage 10, polish applicator 30 is rotatably supported by a frame 80. Frame 80 is movable in the vertical direction. A chain 82 is attached to sprocket wheels 84 and 86 (FIG. 3). An arm 88 with a counterweight 90 is connected to sprocket wheel 86. The counterweight 90 may be moved along the length of arm 88 to vary the counterbalancing moment arm.

Polisher 32 is rotatably supported by a frame 92 which is movable in the horizontal direction. Polisher 34 is rotatably supported by a frame 94 which is movable in the horizontal direction.

The frames carrying polishers 36 and 34 are structurally and operationally similar to frame 80. The frames carrying polishers 38 and 44 are structurally and operationally similar to frame 92, and the frames carrying polishers 40 and 46 are likewise similar to frame 94. The second and third stage frames are therefore numbered in the drawing in accordance with the corresponding frame at the first stage.

Since the frames 94 are close to the guide rail 28 and conveyor 26, they will be close to one side of a passing vehicle regardless of the width of the vehicle. But the distance between the other side of a vehicle and frames 92 will vary with the width of the vehicle. For that reason frames 92 are movable a greater horizontal distance than are frame 94. Movement of these frames to accommodate vehicles of varying widths is illustrated by dotted lines in FIG. 2 at the third stage 14.

Each of the frames 92 and 94 carries a motor 95, such as a one horsepower totally enclosed gear head electric motor. Each frame 80 carries a motor 97, such as a similar two horsepower motor. Motors 95 and 97 are connected by appropriate leads to a control panel (not shown) which is preferably located near the first stage. Automatic or manual actuation of any of the motors causes rotation of its associated applicator or polisher. The speeds of rotation can also be controlled automatically or manually.

Each pod 16 carries two air cylinders 99, one on each side of the pod, connected with the mechanism for moving frame 80 and connected to a source of compressed air (not shown). When actuated, cylinders 99 work in opposition to the associated counterweights 90 to cause frame 80 to be lowered toward the surface to be polished. When the cylinders are not actuated the counterweights will hold the frame up away from the vehicle.

Within the lower or base portion of each side of each pod 16 is an air cylinder 101 (see FIG. 3). Cylinders 101 are connected to an arm 92 or 94 and when actuated, cause their respective arms 92 and 94 to move toward the side surfaces of a passing vehicle.

Each cylinder 101 and each pair of cylinders 99 may be automatically or manually controlled at the control panel. In this manner the applicators and polishers may be selectively brought into proximity to the surfaces to be polished.

Polish is applied to the applicators 30, 32 and 34, and is then applied by those applicators to the surfaces to be polished. Thus at the first stage 10, a series of polish spray nozzles 130 is carried by each of the frames 80, 92 and 94 and spaced along the longitudinal extent of the applicators. The spray nozzles 130 are directed toward the fabric strips 52 so as to spray polish directly onto strips 52 when the applicators are being rotated and the strips are radially extended by centrifugal force. Nozzles 130 are connected by supply lines 132 through a pump 134, to a source or reservoir of polish 136, as illustrated in FIG. 2. The frames 80, 92 and 94 also carry water nozzles 138 which are similarly directed toward the fabric strips 52. Water nozzles 138 are connected by supply lines 140 through a control valve 142, to a water source or reservoir 144.

When a vehicle to be polished approaches the first stage 10, that stage is actuated either automatically, as be sensors, or manually. For example, flexible wands may protrude into the vehicle path. When contacted, the wand causes a microswitch to complete an electrical circuit which actuates the various devices at that stage. The drums comprising part of the applicators 30, 32 and 34 being to rotate, and the centrifugal force causes the unattached ends of the strips 52 to be extended as illustrated in the upper portion of FIG. 4. Valve 142 permits water to flow to nozzles 138, and the water passes through those nozzles and onto the strips 52. The water-wetted strips 52 then receive polish which is sprayed through nozzles 130. The applicators are then ready to begin working on the vehicle surfaces. Water need not be continuously applied, but the fabric strips of the applicators should be maintained in a wet or damp condition during operation.

As the forward portion of the vehicle approaches the applicators the supporting frames are moved into close proximity to the vehicle so that applicator 30 is in close proximity to the upper vehicle surfaces and applicators 32 and 34 are in close proximity to its side surfaces. Preferably, such movements are controlled automatically by the use of sensors or other convenient means, as previously indicated. The distances between the applicators and the vehicle surfaces should be such that a portion of the fabric strips 52, which are extended during rotation of the drum, will come into firm contact with the surfaces. In other words, the distances between applicators and vehicles surfaces, and the rotational speeds of the drums, are to be such that the strips, with polish thereon, will strike the surface with some force and a portion of the strips will then be dragged across that surface as indicated at 150 in FIG. 4. Thus each strip will strike the surface, be bent or deformed and dragged across the surface for a short distance, and then be lifted from the surface as the drum continues to rotate. Successive strips will do the same so that there is a series of intermittent contacts with the surfaces. In this manner, the polish is evenly and effectively "rubbed-in" to the surface. There is sufficient frictional contact between the polish-bearing fabric strips and the finished surface to allow the polish to interact with the finish to remove discoloration and other blemishes.

The frictional contact between the fabric strips and the surface is intermittent, thus allowing heat to escape and not be trapped against the surface and inflict damage. The rotating strips also create an air fan effect tending to dissipate frictional heat, as well as tending to speed-up the polish drying process. The fabric strips are flexible enough to permit adaptation to the contour of the vehicle surfaces and to reach areas of limited accessibility. Relatively narrow stripping of the fabric also aids in contour adaptation, although the strips should be of sufficient size that their weight when wetted, together with their rotational speed and spacing from the surface, assure a significant slapping and dragging action to cause the polish to be rubbed-in to the finished surface.

The frames 80, 92 and 94 are so controlled that they will move to maintain a nearly constant predetermined spacing between the applicators and ploshers which they carry and the vehicle surfaces. For example, the horizontal polish applicator 30 must move along the hood of an automobile and then be raised as the roof moves under it. Sensors and other known control means may be used for this purpose. Frames 92 must also be movable to accommodate vehicles of varying widths.

The polish applied to the vehicle surface as described, should be caused to be dried before the vehicle reaches the second stage 12 where the buffing operation begins. The physical spacing between the first and second stages is made greater than the spacing between the second and third stages. This allows a longer time in transit between the first and second stages during which the polish may dry. As previously mentioned, the fan effect created by the rotating strips 52 also aids in drying. It may also be desirable to place air blowers 156 or other polish drying aids between the first and second stages.

The structure and operation of the second stage polishers is similar to that of the applicators of the first stage, although their function is to buff rather than to apply polish. Except for the absence of the polish nozzles and water nozzles, the polishers 36, 38 and 40 are the same as the applicators 30, 32 and 34. The only significant operational differences are the increased rotational speeds of the polishers 36, 38 and 40 and less pressure between those polishers and the vehicle surfaces.

Buffing is accomplished by the intermittent contacts between the dry fabric strips 52 of the polishers and the vehicle surfaces. Here too, the strips slap and are dragged over the surface as illustrated in FIG. 4. Since the fabric strips are dry, they are not as heavy as in the polish application stage. Rotation is faster making for shorter contact time and greater air flow. The pressure on the surface is less. These factors combine to reduce the likelihood of excessive frictional heat which could damage the finish. The more rapid contact with successive fabric strips also assures that in effect a clean buffing material is constantly being used.

The polishers 42, 44 and 46 of the third stage are like those of the second stage. An increased surface sheen may be obtained where the third stage polishers are rotated faster than those of the second stage with less applied pressure. Thus at the third stage the polishers are positioned further from the vehicle surfaces and are rotated at greater speeds.

When the fabric strips 52 of the polishers leave the vehicle surface as the drums rotate, they tend to rapidly expand to their full length. In other words, once released from contact with the vehicle surface, the strips are "flipped" out to their full length by the centrifugal force. Moreover, if the strips have a resilient backing, it tends to flex or bend so as to aid this action. The net result is that the dry polish and dirt on the strips tends to come off. A self-cleaning action is realized.

Automobiles have been successfully polished to a high sheen in the very short time of about 8 minutes in tests of this invention. A combination cleaner, polish and wax in liquid form was used. The rate of relative movement between vehicles and the apparatus was approximately 10 feet per minute. The applicators at the first stage were rotated at about 100 rpm, and the polishers at the second and third stages were rotated at about 150 rpm and 190 rpm, respectively. A dense cotton carpeting with a rubber backing was used for the strips for each of the applicators and polishers. These strips were about 15 inches long and the rotating drums were each approximately 12 inches in diameter. 16 strips were spaced approximately evenly about the periphery of the drums (i.e., about 25° apart). At the first stage, the centers of the applicator drums were positioned about 12 inches from the vehicle surfaces. The centers of the polisher drums of the second stage were positioned about 14 inches from the vehicle surfaces. The third stage polisher drums were positioned with their centers about 16 inches from the vehicle surfaces.

Although the apparatus has been described as being supported from stationary pods 16 with a vehicle moving past the pods, it could be supported from some other type of frame or housing. For example, the apparatus could be supported fron a housing mounted on wheels wherein the entire housing would be moved past a stationary vehicle.

I claim:

1. An automatic surface polishing apparatus comprising an applicator having a rotatable drum with one end of a fabric connected therewith, means for applying polish to said fabric, a polisher having a rotatable drum with one end of a fabric connected therewith, said fabric having a substantial surface area closely adjacent to a surface to be polished, means for effecting relative movement between a surface to be polished and said applicator and said polisher, means for automatically moving said applicator fabric into contact with a surface to be polished during relative movement between said surface and said applicator to apply polish to said surface by said applicator fabric making intermittent contact with said surface while said applicator drum is being rotated, and means for automatically moving said polisher fabric into contact with said surface during relative movement between said surface and said polisher to polish said surface by said polisher fabric making intermittent contact with said surface while said polisher drum is being rotated.

2. The invention set forth in claim 1 wherein said fabric is a matted, predominately cotton fabric having a resilient backing.

3. The invention set forth in claim 1 wherein a plurality of fabric strips are affixed to said applicator drum along the longitudinal extent of said drum.

4. The invention set forth in claim 1 wherein a plurality of fabric strips are affixed to said polisher drum along the longitudinal extent of said drum.

5. An automatic surface polishing apparatus comprising, a rotatable applicator drum having one end of each of a plurality of fabric strips affixed thereto at spaced intervals about its circumference, means to rotates said applicator drum, means adapted to apply polish onto said fabric strips while said drum is being rotated, a rotatable polisher drum having one end of each of a plurality of fabric strips affixed thereto at spaced intervals about its circumference, said fabric strips having a substantial surface area closely adjacent to a surface to be polished, means to rotate said polisher drum, and means for effecting relative movement between said applicator drum and a surface to be polished and between said polisher drum and said surface, whereby a portion of said applicator fabric strips receive polish and apply polish to said surface by intermittent contact therewith during rotation of said applicator drum and relative movement with said surface, and a portion of said polisher fabric strips intermittently contact and polish said surface during rotation of said polisher drum and relative movement with said surface.

6. A multiple stage automatic vehicle polishing apparatus comprising: a first stage having a rotatable applicator drum with one end of each of a plurality of strips of flexible material affixed thereto at spaced intervals about its circumference, said strips extending along the longitudinal extent of said applicator drum, means to rotate said applicator drum, and means adapted to apply polish onto said strips while said drum is being rotated; a second stage having a rotatable polisher drum with one end of each of a plurality of strips of flexible material affixed thereto at spaced intervals about its circumference, said strips extending along the longitudinal extent of said polisher drum, said strips having a substantial surface area closely adjacent to the vehicle surface to be polished, and means to rotate said polisher drum; and means for effecting relative movement between a vehicle to be polished and each of said stages; said applicator strips receiving polish and applying polish to said vehicle by intermittent contact between portions of said applicator strips and said vehicle during rotation of said applicator drum and relative movement between said vehicle and said first stage, and said polisher strips polish said vehicle by intermittent contact between portions of said polisher strips and said vehicle during rotation of said polisher drum and relative movement between said vehicle and said second stage.

7. The invention set forth in claim 6 with the addition of means to independently vary the spacing between said applicator drum and said vehicle, and the spacing between said polisher drum and said vehicle, and the rotational speeds of each of said drums.

8. The invention set forth in claim 6 wherein said first stage includes a plurality of applicator drums each having fabric strips affixed thereto, said applicator drums being positioned in proximity to the top and both side surfaces of a vehicle during relative movement between said vehicle and said first stage.

9. The invention set forth in claim 8 with the addition of means to control the operation of the top applicator drum independently of the others.

10. The invention set forth in claim 6 wherein said second stage includes a plurality of polisher drums each having fabric strips affixed thereto, said polisher drums being positioned in proximity to the top and both side surfaces of a vehicle during relative movement between said vehicle and said second stage.

11. The invention set forth in claim 6 with the addition of a third stage having a rotatable polisher drum with one end of each of a plurality of fabric strips affixed thereto at spaced intervals about its circumference, whereby said third stage affects a further polishing action by intermittent contact between said vehicle and said third stage fabric strips during rotation of said polisher drum and relative movement between said vehicle and said third stage.

12. The invention set forth in claim 11 wherein the distance between said first and second stages is greater than the distance between said second and third stages.

13. The invention set forth in claim 11 wherein said third stage polisher drum is spaced farther from said vehicle and is rotated faster than said second stage polisher drum.

14. The invention set forth in claim 11 wherein said third stage includes a plurality of polisher drums each having fabric strips affixed thereto, said polisher drums being positioned in proximity to the top and both side surfaces of a vehicle during relative movement between said vehicle and said third stage.

15. The invention set forth in claim 6 wherein said second stage polisher drum is spaced farther from said vehicle and is rotated faster than said first stage applicator drum.

*16. An automatic vehicle surface polishing apparatus comprising:*

*a. an applicator having a plurality of elongated, relatively narrow, flexible, fabric applicator surfaces, ter-*

*minating in free ends and having opposite ends, respectively,*

*b. a polisher having a plurality of elongated, relatively narrow, flexible, fabric polisher surfaces, terminating in free ends and having opposite ends, respectively,*

*c. rotary means,*

*d. mounting means fixing said opposite ends to said rotary means so that each of said fabric surfaces has a substantial surface area closely adjacent to a vehicle surface to be polished, during rotation of said rotary means,*

*e. said opposite ends of said fabric applicator surfaces and of said fabric polisher surfaces being circumferentially spaced about said rotary means and aligned, substantially edge-to-edge, in rows parallel to the rotary axis of said rotary means,*

*f. means for effecting relative movement between a vehicle to be polished and said applicator and said polisher,*

*g. means for supplying polish between said vehicle surface and said fabric applicator surfaces,*

*h. means for driving said rotary means to automatically move the substantial surface areas of said fabric applicator surfaces into contact with the vehicle surface to be polished during relative movement between said vehicle surface and said applicator to apply polish to said vehicle surface by said substantial surface areas of said fabric applicator surfaces making intermittent contact with said vehicle surfaces, and to automatically move the substantial surface areas of said fabric polisher surfaces into contact with a vehicle surface to be polished during relative movement between said vehicle surface and said polisher to polish said vehicle surface by said substantial surface areas of said fabric polisher surfaces making intermittent contact with said vehicle surface.*

*17. The invention according to claim 16 further comprising means for controlling the speed of said rotary means whereby the substantial surface area of each fabric applicator surface rubs the polish into said vehicle surface causing said polish to interact with the finish of said vehicle surface to remove discoloration and other blemishes from said finish.*

*18. The invention according to claim 17 further comprising means for controlling the speed of said rotary means whereby the substantial surface area of each fabric polisher surface slaps and is dragged over said polished vehicle surface without burning or scratching the finished vehicle surface.*

*19. The invention according to claim 16 further comprising means for controlling the speed of said rotary means whereby the substantial surface area of each fabric polisher surface slaps and is dragged over said polished vehicle surface without burning or scratching the finished vehicle surface.*

*20. The invention according to claim 16 in which said means for mounting said opposite ends to said rotary means comprises means for pivotally mounting each of said opposite ends to said rotary means about pivotal axes parallel to the rotary axis of said rotary means.*

*21. The invention according to claim 16 in which each of said fabric surfaces consists of a material having the non-scratching texture of cotton carpeting.*

*22. The invention according to claim 16 in which the circumferential spacing of said opposite ends and the rotary movement of said fabric surfaces is sufficient to provide an effective air fan to facilitate drying whereby said vehicle surface is dry and polished when said means for effecting relative movement between said vehicle surface and said polisher surfaces have caused said polisher surfaces to move relative to said vehicle surfaces.*

*23. The invention according to claim 16 in which the circumferential spacing of said opposite ends and the rotary movement of said fabric surfaces is sufficient to provide intermittent contact of said free ends with said vehicle surface to permit heat to escape from said vehicle surface.*

*24. The invention according to claim 16 in which the distance between each of the free ends of said fabric applicator surfaces and said fabric polisher surfaces and the rotary axis of said rotary means is substantially longer than the closest distance between the rotary axis of said rotary means and said vehicle surface, so that each of said flexible fabric surfaces flexes as said respective fabric surfaces engage said vehicle surface and said substantial surface area of each of said applicator and said polisher surfaces is in wiping contact with said vehicle surface as each of said fabric surfaces relatively moves past said vehicle surface.*

* * * * *